US012705846B2

(12) United States Patent
Leitmann

(10) Patent No.: US 12,705,846 B2
(45) Date of Patent: Aug. 11, 2026

(54) COMPUTER-IMPLMENTED SYSTEM AND METHOD FOR PROVIDING A DIGITAL ASSET MARKETPLACE

(71) Applicant: Zackeri Leitmann, Redlynch (AU)

(72) Inventor: Zackeri Leitmann, Redlynch (AU)

(73) Assignee: Zackeri Leitmann, Redlynch (AU)

( * ) Notice: Subject to any disclaimer, the term of this patent is extended or adjusted under 35 U.S.C. 154(b) by 54 days.

(21) Appl. No.: 18/856,095

(22) PCT Filed: Apr. 13, 2023

(86) PCT No.: PCT/AU2023/050306
§ 371 (c)(1),
(2) Date: Oct. 11, 2024

(87) PCT Pub. No.: WO2023/197041
PCT Pub. Date: Oct. 19, 2023

(65) Prior Publication Data

US 2025/0245933 A1 Jul. 31, 2025

(30) Foreign Application Priority Data

Apr. 14, 2022 (AU) ................................ 2022901014

(51) Int. Cl.
*G06T 19/00* (2011.01)
*G06Q 20/12* (2012.01)
(Continued)

(52) U.S. Cl.
CPC ......... *G06T 19/006* (2013.01); *G06Q 20/123* (2013.01); *G06Q 20/382* (2013.01);
(Continued)

(58) Field of Classification Search
CPC .... G06Q 10/10; G06Q 20/123; G06Q 20/382; G06Q 20/401; G06Q 2220/00;
(Continued)

(56) References Cited

U.S. PATENT DOCUMENTS 10,789,475 B2 * 9/2020 Yin ........................ G06F 3/011
2018/0314484 A1 * 11/2018 Pahud .................. G06F 3/1454
(Continued)

FOREIGN PATENT DOCUMENTS

KR 102078967 B1 2/2020

OTHER PUBLICATIONS

International Search Report for corresponding International Patent Application No. PCT/AU2023/050306, dated Aug. 8, 2023, 4 pages (for informational purposes only).
(Continued)

*Primary Examiner* — Ming Wu
(74) *Attorney, Agent, or Firm* — Viering, Jentschura & Partner mbB

(57) ABSTRACT

The present invention relates to a system and method of providing a digital asset marketplace. In particular, the present invention relates to facilitating buying and selling of Non-Fungible Tokens (NFTs) by providing NFT owners with a means of showcasing and offering their NFTs for purchase in a preferred location or space, and similarly, providing potential purchasers with the ability to locate, view and purchase or trade NFTs according to their preferences.

19 Claims, 8 Drawing Sheets

(51) Int. Cl.
*G06Q 20/38* (2012.01)
*G06Q 20/40* (2012.01)
*G06Q 30/0601* (2023.01)

(52) U.S. Cl.
CPC ....... *G06Q 20/401* (2013.01); *G06Q 30/0643* (2013.01); *G06Q 2220/00* (2013.01)

(58) Field of Classification Search
CPC ............. G06Q 30/018; G06Q 30/0251; G06Q 30/0276; G06Q 30/0277; G06Q 30/06; G06Q 30/0643; G06Q 40/04; G06Q 50/184; G06Q 50/188; G06T 19/006; H04L 2209/56; H04L 9/50
See application file for complete search history.

(56) References Cited

U.S. PATENT DOCUMENTS

| | | | | |
|---|---|---|---|---|
| 2019/0138260 | A1 | 5/2019 | Rogers et al. | |
| 2019/0147246 | A1* | 5/2019 | Bossut | G06F 16/951 382/103 |
| 2020/0005284 | A1 | 1/2020 | Vijayan | |
| 2020/0285788 | A1* | 9/2020 | Brebner | G06F 18/251 |

OTHER PUBLICATIONS

TruOrigin Location-Based AR NFT Marketplace; retrieved from https://truorigin.io/ on Oct. 11, 2024, dated 2021, 9 pages.
Katz, Braden; TruOrigin Pitch; retrieved from https://www.youtube.com/watch?v=_rCfd7RezTA on Oct. 11, 2024, dated 2022; 2 pages.

* cited by examiner

COMPUTER-IMPLMENTED SYSTEM AND METHOD FOR PROVIDING A DIGITAL ASSET MARKETPLACE

CROSS-REFERENCE TO RELATED APPLICATIONS

This is a national phase of international application PCT/AU2023/050306, filed on Apr. 13, 2023, which claims priority to AU application Ser. No. 20/229,01014, filed on Apr. 14, 2022, the entire contents of each of which are incorporated herein.

FIELD OF THE INVENTION

The present invention relates to a system and method of providing a digital asset marketplace. In particular, the present invention relates to facilitating buying and selling of Non-Fungible Tokens (NFTs) by providing NFT owners with a means of showcasing and offering their NFTs for purchase in a preferred location or space, and similarly, providing potential purchasers with the ability to locate, view and purchase or trade NFTs according to their preferences.

BACKGROUND OF THE INVENTION

The use of blockchain technology for performing economic transactions has become ubiquitous. Blockchains contain a growing list of records, called blocks, which are linked using cryptographic techniques. Each block in the blockchain includes a cryptographic hash of the previous block, and thereby forms a chain in which each additional block reinforces the blocks before it. Also included in each block is a timestamp and transaction data, where the timestamp proves that the transaction data existed at the time the block was published. Manipulating data for nefarious reasons in a blockchain is almost impossible since the data logged in any given block cannot be altered without altering subsequent blocks.

A NFT is a data unit stored on a blockchain that certifies a digital file as unique, similar to a cryptographic token. The digital file is provided a digital signature, which means that NFTs may be tracked on blockchains to provide the owner with proof of ownership. NFTs are therefore digital assets, and may represent real-world objects such as art, music, in-game items and video, and may be bought and sold online (usually with cryptocurrency). In this regard, NFTs are becoming increasingly used by individuals to buy and sell unique digital items such as digital artwork.

Digital assets such as digital artwork may be viewed using Augmented Reality (AR) devices, such as smart glasses, configured to display real-world environments that are enhanced by computer-generated information. AR is becoming an increasingly popular tool to allow individuals to present and showcase their NFTs to others.

However, a problem associated with the use of NFTs to buy and sell ownership of digital items is that it can be difficult for digital asset owners to showcase their NFTs to the wider purchasing public, or to showcase their NFTs at a location or in a manner of their choosing. Similarly, individuals who may be interested in purchasing ownership of digital items may find it difficult locating such items, or locating items which satisfy the particular individual's preferences.

Accordingly, there exists a need for a system and method that addresses or at least ameliorates some of the above-mentioned problems.

The reference to any prior art in this specification is not, and should not be taken as, an acknowledgement or any suggestion, that the prior art forms part of the common general knowledge.

SUMMARY OF THE INVENTION

In one aspect, the present invention provides a computer-implemented method of providing a digital asset marketplace, the method including, providing, by one or more processors, one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of, a real-world object, and a body or body part associated with the one or more first users, including persons or animals associated with the one or more first users, receiving, by one or more processors, a selection from the one or more first users regarding particular location(s) or space(s) upon which the one or more first users prefer to virtually display their digital asset(s), and details regarding their digital asset(s), uploading, by one or more processors, the digital asset(s) to the particular location(s) or space(s) selected by the one or more first users, receiving, by one or more processors, from a data communications device associated with a second user, a request to locate digital assets available for purchasing and/or trading within a particular geographical area, and causing, by one or more processors, the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device.

In an embodiment, the available digital assets are owned or managed by the one or more first users via Non-Fungible Tokens (NFTs). In an embodiment, the NFTs include sound, video(s) and/or image(s)

In an embodiment, each location or space is layered with a plurality of different digital assets.

In an embodiment, the method further includes prompting, by one or more processors, the second user to view each available digital asset of the plurality of different digital assets associated with the location or space by swiping through graphical representations of the digital assets using the AR device of the second user.

In an embodiment, the second user is prompted to utilise a left and right swipe function to view the different digital assets.

In an embodiment, the method further includes, based on the second user viewing available digital assets at a particular location or space by means of the AR device, prompting, by one or more processors, the second user to purchase or trade a digital asset selected from the available digital assets using another digital asset owned by the second user.

In an embodiment, the method further includes, based on the second user selecting an available digital asset for purchase or trade and compensating the first user according to agreed purchase or trade terms, updating, by one or more processors, the ownership of the digital asset to reflect the second user as the new owner In an embodiment, updating the ownership of the digital asset includes updating the blockchain with which the digital asset is associated. In this regard, ownership of the digital assets is tracked, verified and maintained by blockchain technology.

In an embodiment, updating the ownership of the digital asset includes updating the blockchain with which the digital asset is associated and a destination blockchain to which the digital asset is to transfer in accordance with the purchase or trade terms, by, deploying a first smart contract to the blockchain with which the digital asset is associated in a locked state, and deploying a second smart contract to the destination blockchain for the purpose of unlocking the digital asset on the destination blockchain.

In an embodiment, the other digital asset owned by the second user that is used to purchase or trade the available digital asset includes one or more of, cryptocurrency, and tokenized assets.

In an embodiment, the real-world object, or body or body part associated with the first user or person or animal associated therewith, includes a digital marker that, when scanned using a camera device associated with the AR device of the second user, activates an augmented experience for the second user including providing the second user with the ability to view digital assets associated with the marker.

In an embodiment, the digital marker includes a Quick Response (QR) code.

In an embodiment, the real-world object with which the digital marker is associated is a structural component of a building or streetscape, including one or more of, a wall, a roof, a window, and a door.

In an embodiment, the real-world object selected by the first user includes a geo-location such that when the AR device of the second user arrives at the geo-location and a camera device associated with the AR device is used to view the real-world object, an augmented experience is activated for the second user which provides the second user with the ability to view digital assets associated with the geo-location.

In an embodiment, the body or body part associated with the first user or person or animal associated therewith, includes wearable technology that, when scanned using a camera device associated with the AR device of the second user, activates an augmented experience for the second user including providing the second user with the ability to view digital assets associated with the wearable technology.

In an embodiment, the wearable technology includes one or more of, clothing embedded with a digital asset, a near field communications (NFC) dongle, a bio-implant NFC chip, and an externally bonded NFC chip.

In an embodiment, the method further includes providing, by one or more processors, a facility to the second user to record details with respect to their preferences including favourite artist(s) and genre(s), and providing, by one or more processors, one or more recommendations to the second user regarding available digital assets based upon the recorded details of the second user.

For example, recommendations relating to particular works of art, items of clothing, or promotional/advertising experiences, may be provided based upon the second user's details. Where the digital asset is an image, the image may include advertising or promotional material and the method further includes enabling advertisers to send notifications to promote products/services to the first and second users.

In an embodiment, the method further includes receiving location data (e.g. GPS coordinates) relating to movement of the second user and updating the recorded details of the second user accordingly such that the one or more recommendations to the second user regarding available digital assets are further based on the location data. In this way, the one or more recommendations sent to the second user regarding digital assets, such as digital works of art that are available for viewing, is also based upon the additional data.

In an embodiment, the method further includes providing, by one or more processors, a live chat function that enables the first and second users to communicate via their respective devices including to negotiate purchase and/or trading terms with respect to available digital assets owned by the first users. Such communications may include text, emoji, GIF functions, and reactions utilising customisable emojis.

In an embodiment, the method further includes providing functionality to integrate cryptocurrency and NFT asset wallets for users.

In an embodiment, the second user is required to pay a fee to view a digital asset.

In an embodiment, the method further includes verifying the identity of the first and/or second users, including verifying personal details such as height, weight and age, biometric data and NFC bio-implants and external bonded NFC devices (e.g., fingernail chips).

In a second aspect, the present invention provides a system for providing a digital asset marketplace, the system including one or more processors that, provide one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of, a real-world object, and a body or body part associated with the one or more first users, including persons or animals associated with the one or more first users, receive a selection from the one or more first users regarding particular location(s) or space(s) upon which the one or more first users prefer to virtually display their digital asset(s), and details regarding their digital asset(s), upload the digital asset(s) to the particular location(s) or space(s) selected by the one or more first users, receive, from a data communications device associated with a second user, a request to locate digital assets available for purchasing and/or trading within a particular geographical area, and cause the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device.

In a third aspect, the present invention provides a computer-readable medium that when executed on a computer, causes one or more processors of the computer to perform steps to provide a digital asset marketplace, including providing one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of, a real-world object, and a body or body part associated with the one or more first users, including persons or animals associated with the one or more first users, receiving a selection from the one or more first users regarding particular location(s) or space(s) upon which the one or more first users prefer to virtually display their digital asset(s), and details regarding their digital asset(s), uploading the digital asset(s) to the particular location(s) or space(s) selected by the one or more first users, receiving, from a data communications device associated with a second user, a request to locate digital assets available for purchasing and/or trading within a particular geographical area, and causing the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device.

In a fourth aspect, the present invention provides an electronic device that provides access to a digital asset marketplace, the device located at a geographic location that has been selected by one or more first users to virtually display digital asset(s) that are available for purchase or trade and that are viewable by means of Augmented Reality (AR) devices, the electronic device including, an augmented reality (AR) viewing device for use by one or more second users physically present at the location, the AR viewing device including a camera device and display that enables users to view real-world objects associated with the location, and a touch screen configured to receive an input corresponding to a touch operation of a second user on an area of the touch screen, and a processor connected to the touch screen, wherein the processor is configured to detect the input to the touch screen and perform operations including, detecting a first input, via the touch screen, of a request from a second user to locate digital assets available for purchasing and/or trading at the location, displaying, via the AR viewing device, a depiction of the digital asset(s) that have been virtually displayed by the first user at the location and that are available for purchase or trade, such that the real-world objects that are viewable on the AR viewing device are augmented with the depiction of the digital asset(s), and detecting a second input, via the touch screen or the AR viewing device, a selection by the second user of a particular digital asset for purchase or trade.

BRIEF DESCRIPTION OF THE DRAWINGS

Embodiments of the invention will now be described in further detail with reference to the accompanying Figures in which.

DETAILED DESCRIPTION OF EMBODIMENT(S) OF THE INVENTION

For simplicity and illustrative purposes, the present disclosure is described by referring to embodiment(s) thereof. In the following description, numerous specific details are set forth to provide a better understanding of the present disclosure. It will be readily apparent, however, that the current disclosure may be practiced without limitation to the specific details. In other instances, some methods and structures have not been described in detail to avoid obscuring the present disclosure.

Figure 1:
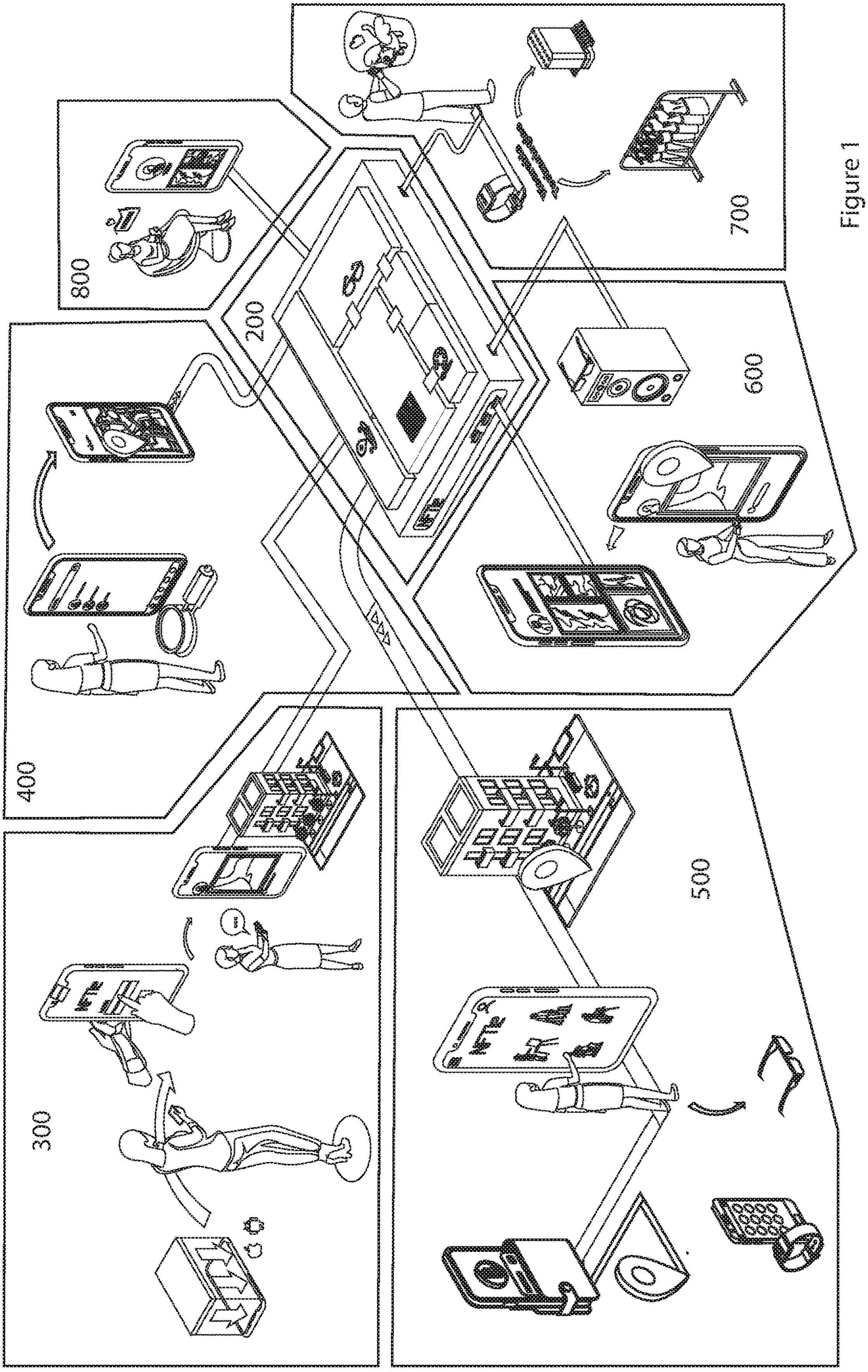
FIG. 1 provides an overview of a system according to an embodiment of the present invention showing, in particular, the interaction between the various system components.

The present invention, according to an embodiment, relates to a system and method for providing a digital asset marketplace which allows users (70) to view and purchase or trade digital assets (85) owned or managed by other users (30), as depicted in FIG. 1. The system and method provide a platform that hosts a computer-executable software application (40), wherein the application (40) is accessible by each of the users (30) and (70). The platform enables the generation of a map (75) in response to a request by user (70), wherein the map (75) displays any locations or spaces (60) in which digital assets (85) owned by users (30) may be viewed by the user (70), wherein the user (70) must be physically present at the location or space (60) to view the digital asset(s) (85) by means of an Augmented Reality (AR) device (80).

The platform is provided by a central server (20) which maintains one or more processors and/or databases for performing functions, including providing users (30) with selectable locations or spaces (60) available for displaying their digital assets (85), wherein the selectable locations or spaces (60) are suitable for displaying digital assets such that at those locations or spaces the digital assets become viewable by means of AR devices (50). The locations or spaces are associated with one or more of a real-world object (e.g. a shop window or wall of a building), and a body or body part associated with the user (30). The server (20) is further configured to receive a selection from the user (30) regarding the particular location(s) or space(s) upon which the user (30) prefers to virtually display their digital asset(s) (85) along with details regarding the digital asset(s).

The selected digital asset(s) (85) may then be uploaded to the particular location or space (60) selected by the user (30), and the particular location or space (60) is then made available for searching by one or more other users (70) seeking to find locations or spaces to view digital assets (85) that are available for purchase/trade within a particular geographical area. In this regard, users (30) may be presented with a map (75) of a particular geographical area of interest, wherein the map displays any locations or spaces (60) in which digital assets (85) have previously been registered by users (30) such that when the users (70) are physically present at the location or space (60), they may view the digital assets(s) (85) by means of their AR devices (80).

The digital assets (85) may be owned by the users (30) via Non-Fungible Tokens (NFTs), and once the user (70) has viewed the digital asset (85) at a particular location or space (60), the user (70) may be prompted to purchase the digital asset (85) in exchange for compensation to the user (30), or trade the digital asset (85) with an existing digital asset owned by the user (70). Where there is a transfer of ownership of a digital asset (eg. by purchase of the digital asset (85)), the ownership of the NFT may be updated to reflect the owner (70) as the new owner, and any associated blockchain may be automatically updated.

The person skilled in the relevant field of technology will appreciate that the platform provides a solution to existing problems associated with the difficulty confronted by digital asset owners to showcase their NFTs to the wider purchasing public, or to showcase their NFTs at a location, or in a manner, of their choosing. In addition, problems associated with individuals who are interested in purchasing ownership of digital items but find it difficult to locate such items, or to locate items which satisfy the particular individual's preferences, are also addressed by the present invention. Accordingly, users of the platform may engage in selling and/or trading NFTs relating to physical articles such as clothing, artwork, etc, such that the NFT is transferred to the new buyer/trader. Such NFTs may be purchased using cryptocurrency and automatically stored in a cryptocurrency wallet, or similar facility, associated with the purchasing entity (70).

In view of the above practical and useful results that arise from this implementation of the present invention, the combined use of data communications (50) and AR devices (80), as well as the interaction with the blockchain and in particular, the use of such devices to automatically alter the blockchain upon confirmation of a sale or trade of a particular NFT, represents an improvement as compared with the use of conventional technology for purchasing or offering for sale NFTs.

FIG. 1 is divided into segments which are further expanded in subsequent FIGS. 2-8. In particular, Segment 200 of FIG. 1 shows the server component (20) with which a software application (40) operating on data communication devices (50) as well as AR devices (80) of individual users (30) and (70) are configured to communicate.

It will be apparent to the person skilled in the relevant field of technology that the software application (40) may be a mobile application or a web application, and similarly, the device (50) utilised by each user may be a portable device such as a mobile phone or laptop, or alternatively a fixed location device such as a personal computer (not shown). The AR device (80) must be a portable device on the basis that such devices need to be transported to locations (60) with which digital assets (85) are associated. The server component (20) is additionally detailed in FIG. 2.

The skilled person will appreciate that the steps described herein may be executed by the device (50) and/or AR device (80), wherein such operations are facilitated by the software application (40) operating on each device. According to another implementation of the present invention, the server (20) is programmed to provide most, or all, of the functions described herein particularly where they cannot be provided locally on the user devices (50) and (80) or where it may be commercially or technically impractical to implement. In other words, the steps described herein as performed by the device (50) or AR device (80), or components thereof, may be associated with hardware that is located externally of the devices, such as the remote central server (20) for example (ie. in a distributed architecture). Different arrangements are possible in this regard, and alternate variations will be apparent to the person skilled in the relevant field of technology.

Segment 300 of FIG. 1 shows how the server (20) may be configured for communication with the devices (50) associated with user (30). In one example, the server (20) may receive data from the devices (50) for the purposes of creating a user profile (eg. based upon the entry of details from the user (30)). Segment 300 of FIG. 1 further shows the user (30) downloading and installing the application (40) and subsequently accessing the application (40) to establish the user account and profile, and to search for and select a location or space (60) that is available for displaying digital assets (85). Segment 400 of FIG. 1 shows example interfaces from the perspective of a second user (70) seeking the location of digital assets (85) within a particular geographical area for the purpose of viewing and purchasing/trading digital assets (85), which may include the location or space (60) entered by the first user, as further detailed in FIG. 4.

Segment 500 of FIG. 1 shows an additional example interface which allows the second user (70) to view the digital assets (85) that are available for purchase/trade at the particular location or space (60) (ie. once the second user (70) has physically arrived at the location or space to view the digital asset by means of their AR device (80)). In this regard, the user's mobile device (50) may be utilised as an augmented reality device (80) through the software application (40) such that the device's camera is directed at the particular location or space (60) and an augmented reality display is provided to the user (70). Alternatively, the user (70) may prefer to use other AR devices (80) such as a wearable smart watch or smart glasses. A cryptocurrency wallet (90) may be utilised to make purchases, as described in greater detail below, and as detailed in FIG. 5.

Segment 600 of FIG. 1 shows a further example interface which may be generated upon the selection of a particular digital asset (85), including an additional advertising interface. In the particular example shown, the digital asset includes sounds and images, and associated advertising, as further detailed in FIG. 6. Segment 700 of FIG. 1 shows examples of wearables (95) which may be encoded with NFT digital assets such as NFT artwork, and where Near Field Communication (NFC) tags associated with digital assets may be loaded with the unique artwork, as further detailed in FIG. 7. Finally, Segment 800 of FIG. 1 shows an additional example interface in which additional functionality associated with the software application (40) may be accessed by each user (30) and (70) for the purpose of chatting or receiving alerts and/or notifications, as further detailed in FIG. 8.

As mentioned above, FIG. 2 shows in greater detail Segment 200 of FIG. 1 and, in particular, FIG. 2 shows the server component (20) which includes infrastructure upon which the platform of the present invention operates. The infrastructure may be local or cloud-based. The central server (20) may operate one or more computer processors and maintain one or more databases to enable the following functionality or storage:

User account register (100) storing details of each of the first set of users (30) and the second set of users (70) (eg. name, address, contact details, and any additional detail which may be relevant for the purpose of identifying each user). Additional details which may be stored in the user account register (100) include locations or spaces (60) registered by users (30) as locations or spaces which are suitable for displaying digital assets (85) (e.g. real world objects, a body or body parts, etc). Additionally, details relating to cryptocurrency or other financial accounts held by the users (30) and (70) may also be stored in user account register (100) including, for example, details relating to users' crypto currency wallets (90) to enable the purchase of digital assets (85);

Digital assets (e.g. artwork) database (105) storing details relating to digital assets (85) registered by the first users (30) at the particular locations or spaces (60), including details relating to the particular blockchain upon which the NFT data unit is stored, and the presence of any NFC tags loaded with particular images, videos, music, sounds, advertisements, etc, that form part of the stored digital assets (85);

Data processing functionality (110) for generating maps (75) of geographical areas specified by users (70) and for displaying registered locations or spaces (60) upon which digital assets (85) are viewable with the maps (75) using AR devices (80). The functionality (110) may utilize one or more augmented reality algorithms to display the digital assets (85) in a form recognizable by particular AR devices (80) associated with users (70) who are located at the specific locations or spaces (60);

Geolocation map Application Programming Interface (API) (115) which enables the software application (40) to integrate with external applications, such as Google Maps or Apple Maps, that are configured to display and enable user interaction including to provide directional information to locations of interest, the API operable to generate the required maps (75) in response to queries from users (70).

Figure 2:
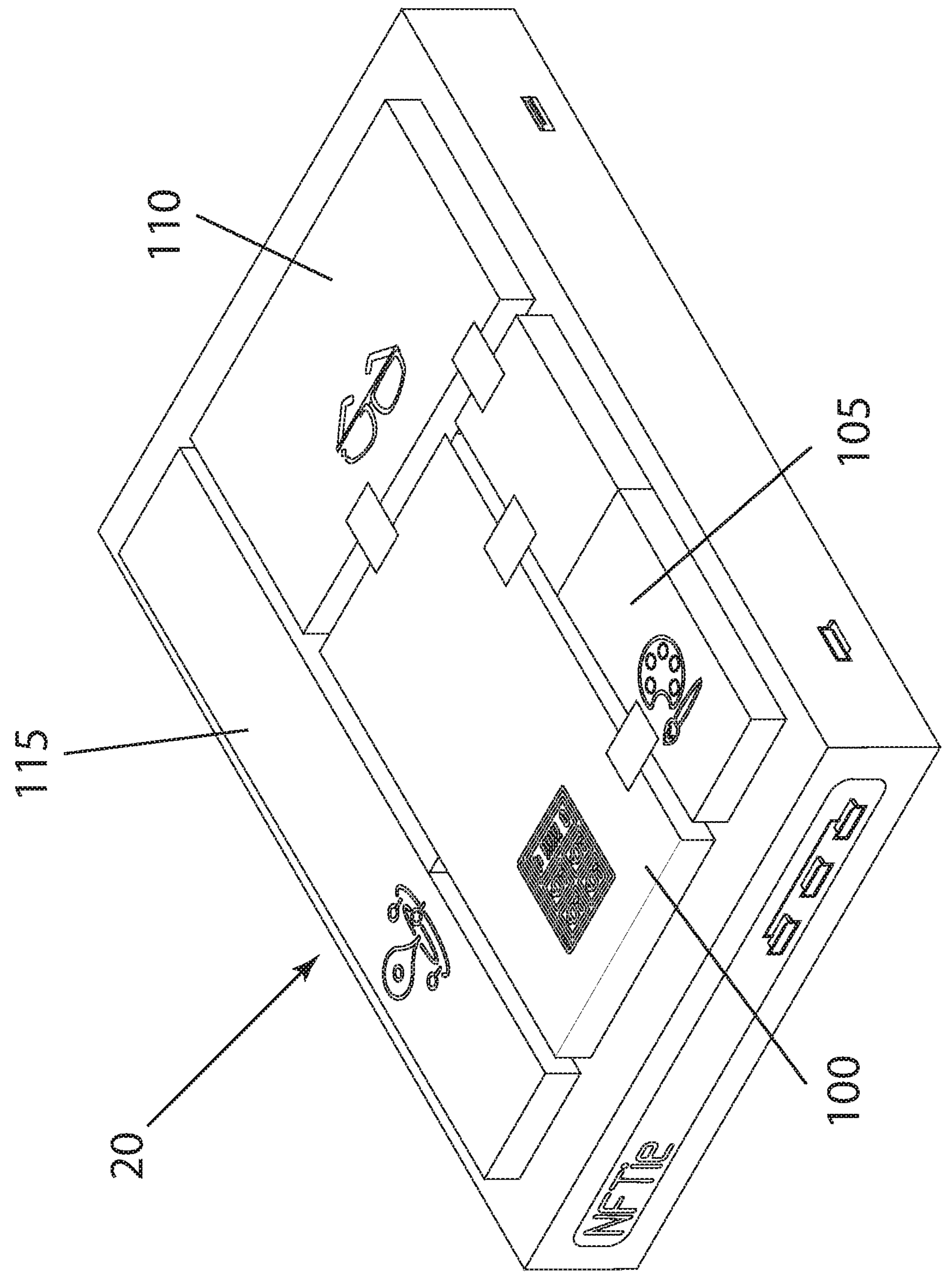
FIG. 2 illustrates a diagram associated with an exemplary server component within the system illustrated in FIG. 1.

FIG. 2 also depicts server (20) configured to enable communication (140) with the devices (50) and the AR devices (80) and, in particular, the software application (40) operating on each device. Such communications may occur via the internet or similar network.

Figure 3:
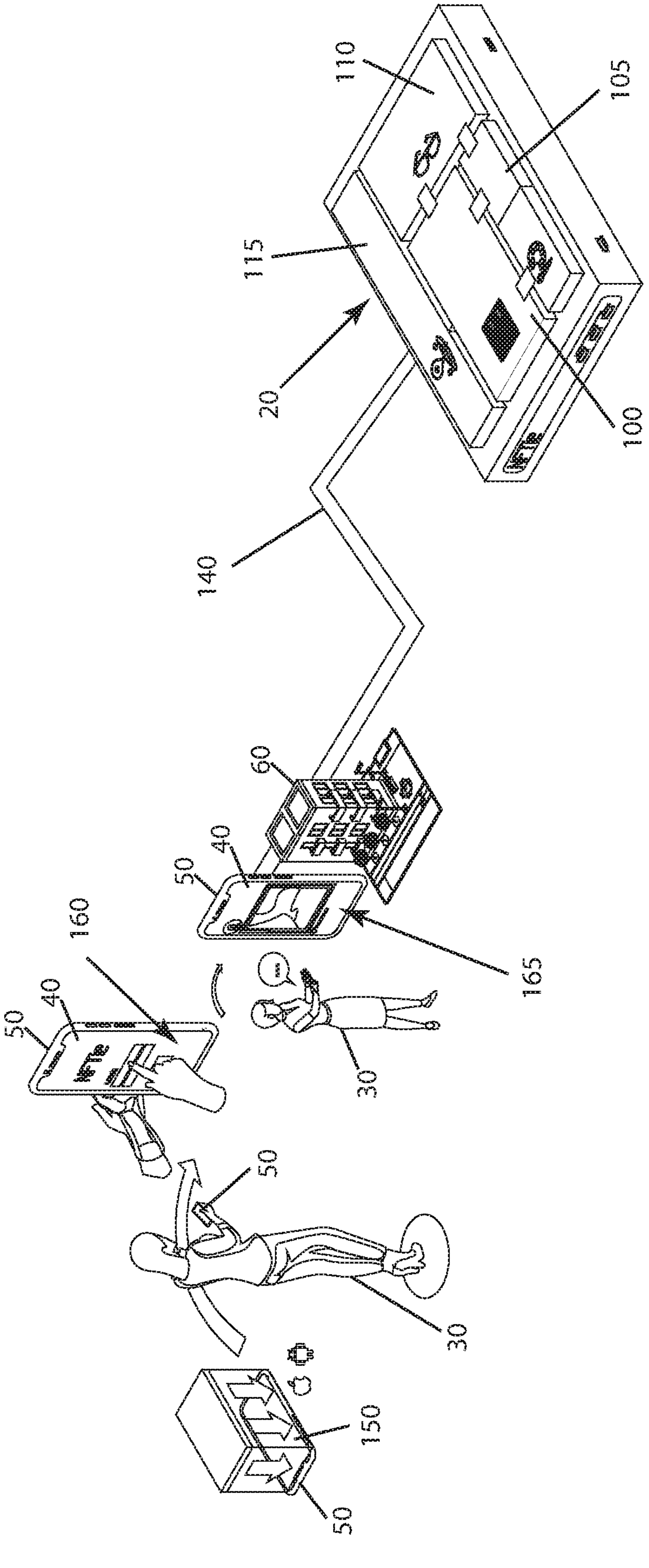
FIG. 3 illustrates a flow diagram of an exemplary process that enables a first user to download and install a software application, and subsequently access, or register to use, the software application for interaction with the system illustrated in FIG. 1, including to confirm a particular location or space for virtually displaying a digital asset.

FIG. 3 shows in greater detail Segment 300 of FIG. 1 and, in particular, the steps associated with a user (30) installing (150) the software application (40) on their device (50) and subsequently accessing a user login and registration interface (160) associated with the application (40). Such access may be granted after the user (30) has installed the application which may be achieved by downloading the application (40) from an application store. Each user (30) may create an account (which may include a user profile) using the application (40) and the account/profile information may be stored in the user account register (100). A similar download, installation and registration process may apply equally to users (70).

Once user (30) has accessed the application (40), the user (30) may be presented with a further interface (165) that allows the user (30) to register a location or space (60) available for displaying digital assets (85) owned or managed by the user (30). In the example shown, the registered location is the wall of a building, and in this embodiment, the user (30) may enter details such as the address of the building, details relating to the particular wall such as 'north-facing', and any additional details relating to the particular digital asset(s) (85) which the user (30) prefers to associate with the particular location or space (60).

The digital assets (85) may be owned by the user (30) via non-fungible tokens (NFTs), hence the application (40) may automatically prompt the user (30) to enter relevant details relating to the NFT as well as any associated blockchain information. The user (30) may be further requested to provide verification information such as a certificate of ownership or similar.

In another embodiment, the software application (40) may include functionality that enables users (30) to create NFT digital assets such as NFT artwork, whereby such assets (upon creation) may be automatically stored in the digital asset database (105) such that the NFT becomes available for allocation to a particular location or space (60).

Figure 4:
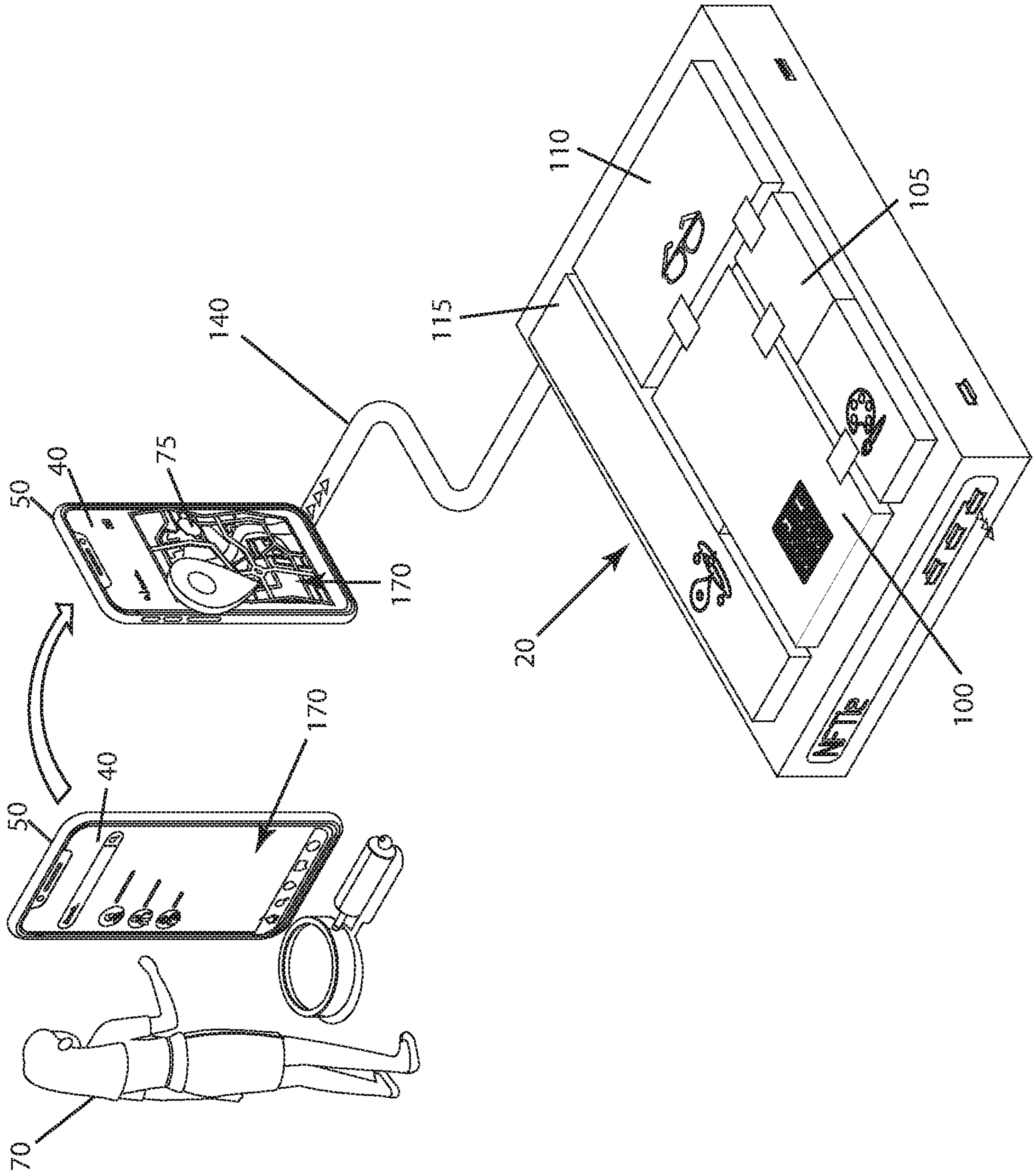
FIG. 4 illustrates a flow diagram of an exemplary process that enables a second user to utilise the software application to request the location of digital assets available for viewing and purchasing within a particular geographical area.

FIG. 4 shows in greater detail Segment 400 of FIG. 1 and, in particular, the steps associated with the user (70) conducting a search and being presented with an interactive map (75) using software application interface (170). In particular, the user (70) may enter a request to locate digital assets (85) available for viewing and purchasing within a particular geographical area, and the generated map (75) may display any locations or spaces (60) inside the geographical area against which digital assets (85) of first users (30) are registered such assets (85) will be viewable by the second user (70) after physically travelling to the location (60) by means of an AR device (80).

At the time of registration, users (70) may record additional details that are stored in register (100) including their preferences and interests. These may include, for example, favourite artists(s) and genre(s), wherein search results may be automatically presented to the user (70) or filtered based upon such preferences and based upon the registered location of the user (70). For example, one or more recommendations may be presented to users (70) regarding digital assets (85) available for purchase/trade based upon such recorded details, rather than requiring the user (70) to enter a detailed manual search. In one example, the recommendations may relate to particular works of art, items of clothing or promotional/advertising experiences.

The additional detail that is gathered in relation to user (70) may include location details regarding the movement of user (70) (eg. GPS-tracked movement), wherein recording such data against the user's profile may give rise to recommendations regarding digital assets (85) such as digital works of art that are available for viewing based upon for example, a selected or predicted travel path of the user.

Figure 5:
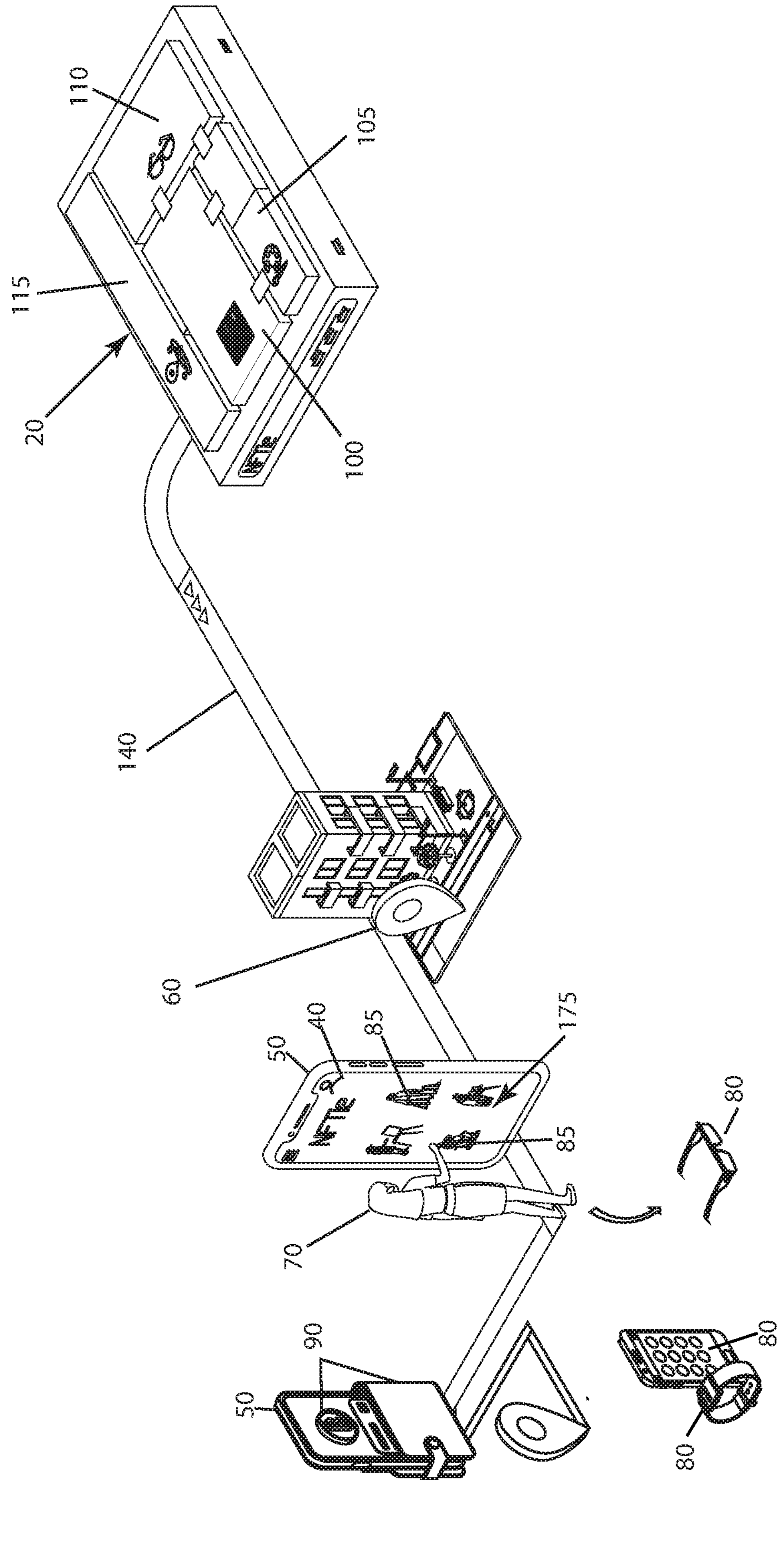
FIG. 5 illustrates a flow diagram of an exemplary process that enables the second user to visit at a particular location and utilise an AR device to view and purchase/trade digital assets at the particular location.

FIG. 5 shows in greater detail segment 500 of FIG. 1, and, in particular, the steps associated with the user (70) travelling to a particular location (60) presented in the search results displayed in the interactive map (75) of interface (170). Once the user (70) is physically present at the location (60) they may utilise their AR device (80) to view, through the device's camera, the particular location (60) (e.g. the wall of a building) in order to be presented with the digital asset(s) (85) associated with the particular location (60) and available for purchase/trade. The digital assets (85) available for selection are shown, by way of example, in interface (175) of FIG. 5.

Figure 7:
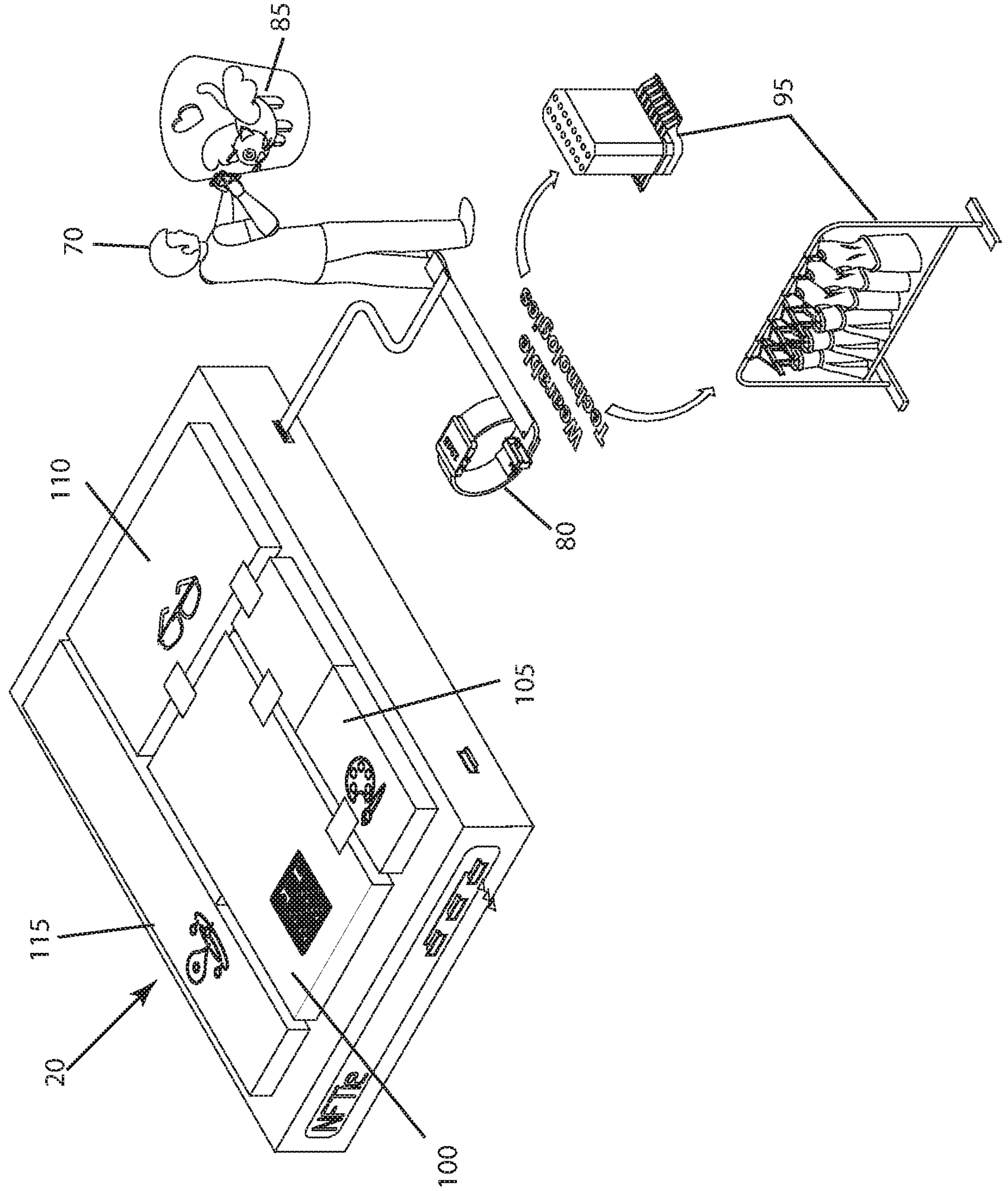
FIG. 7 illustrates a diagram associated with example wearables which may be encoded with NFT digital assets.

It will be understood that any suitable AR device (80) may be utilised, including any device that has AR display capabilities including, for example, a smartphone device, a wearable smartwatch, or smart glasses. Also shown in FIG. 5 is an example of a cryptocurrency wallet (90) associated with user (70), indicating that the user (70) (after selecting to view additional details of a particular digital asset (85) as shown by way of example in FIG. 6) may purchase a digital asset (85) of interest using cryptocurrency. It will be understood that whilst viewing the digital asset (85) requires the user (70) to be physically present at the location (60), purchasing of the digital asset (85) may be made from any location. It will be further understood that the locations or spaces (60) registered by users (30) may be capable of being layered with a plurality of different digital assets (85), and the plurality of digital assets (85) may be presented in interface (175) in a manner that enables the user (70) to easily view same. For example, the interface (175) may enable user (70) to 'swipe' through the different digital assets available for viewing at the particular location or space (60) (e.g. a left/right swipe function to view the different digital assets).

Where the location or space (60) for displaying the assets (85) is not a real-world object but is rather a human or animal body or a particular body part associated with a human animal, (e.g. an arm or a leg of the user (30), limb of a pet, etc) the user (30) may be required to attach a means of displaying the digital asset to the designated body part to enable other users (70) to view the particular digital asset once they encounter the user (30), user's pet, etc as described in greater detail below with respect to FIG. 7.

It will be appreciated that when a user (70) visits a location (60) in order to view particular digital assets (85) available for purchase/trade using their AR device (80), there may be circumstances in which the user (30) offering the assets (85) for purchase/trade may prefer to block certain features from being displayed to the user (70), particularly where the digital asset (85) is associated with the body part of the user (30) or a person or animal associated therewith. For example, where the digital asset is associated with a body part of a child, the user (30) may prefer that certain features of the child are hidden from view in order to protect the identity and privacy of the child. In this regard, the system may offer privacy/blackout functionality to users (30) which provides users (30) with the ability to prevent certain features from being viewed by users (70) through their AR devices (80), thereby protecting the user (30) and any corresponding humans or animals tasked with wearing the NFT assets (85) on behalf of the user (30).

Figure 6:
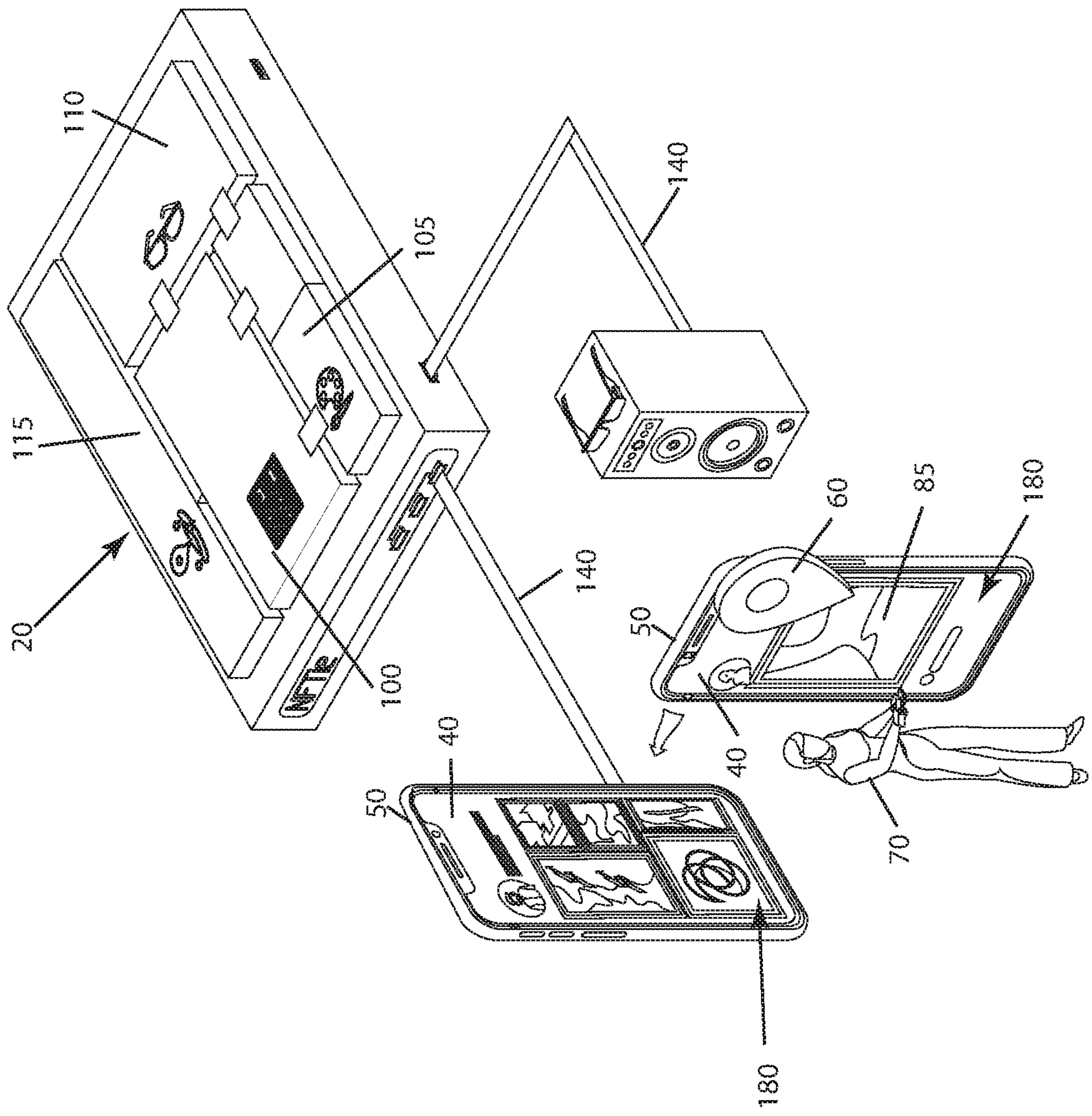
FIG. 6 illustrates a diagram associated with example interfaces of the software application including an interface that enables the second user to view additional details associated with a selected digital asset, including images, sounds and advertising associated with the particular asset.

FIG. 6 shows in greater detail Segment 600 of FIG. 1 and, in particular, additional example interfaces (180) associated with the software application (40) following the selection of a particular digital asset (85) by a user (70). The interfaces (180) may present an image of the digital asset (assuming the digital asset involves an image), as well as any associated sounds (as indicated by the speaker in FIG. 6), and any additional information (eg. advertising) associated with the selected digital asset (85). The interface (180) may also present the user (70) with a facility to enable the purchase, or trade, of the selected asset (85), whereby if a particular digital asset is purchased, then based upon an agreed sale price for the digital asset (85), funds from wallet (90) associated with the user (70) may be automatically deducted. Alternatively, where the user (70) owns their own digital asset(s) (85), the users (30) and (70) may agree to trade digital assets. Where the traded digital assets have an equal value, there is no requirement for funds to be exchanged. However, where there is a difference in value, the difference in value may be automatically deducted from the relevant user's crypto wallet (90).

The advertising material associated with the digital asset (85) shown in FIG. 6 may include images and other media provided by advertisers, thereby enabling advertisers to utilise the platform to effectively send notifications to users (70) to promote their goods/services to the users (70).

Where the user (70) purchases or trades a digital asset (85), the ownership of the particular NFT is updated to reflect the new owner(s), and relevant blockchains may also be updated. In this regard, the skilled addressee will appreciate that ownership of the digital assets may be tracked, verified and maintained by blockchain technology.

It is to be understood that additional blockchain functionality may be utilised in order to facilitate the process of purchasing or trading digital assets (85). For example, cross blockchain bridging functionality may be implemented which allows multiple blockchains to execute smart contracts for viewing, minting and sale of NFTs (e.g. Ethereum chain, Binance smart chain, and Solana). In particular, the asset (85) may be locked in an original blockchain by deploying a first smart contract that allows for cross-chain transfers, and may be unlocked or minted on a destination blockchain in which a second smart contract has been deployed that also allows for cross-chain transfers. In other words, the two smart contracts may interoperate to create a single unified application which can result in benefits to the users involved in the purchase/trade including the ability to hold the respective tokens/assets within a single wallet, reduced fees and faster transaction times.

FIG. 7 shows in greater detail segment 700 of FIG. 1 and, in particular, wearable technologies (95) which may be encoded with NFT assets such as NFT artwork. Such technologies may be utilised where, for example, a user (30) prefers to associate a digital asset (85) with their body or body part. For example, an NFC tag loaded with unique artwork may be associated with such NFT-based wearable (in the examples shown, an NFC dongle including a bio-implant NFC and external bonded NFC (e.g. fingernail chip)), wearables in the form of clothing which may be encoded with NFT artwork (e.g. user/artist created and/or licensed skins, etc).

Such technologies may also be utilised to verify the identity of the users (30) and (70) including to verify personal details such as height, weight and age, wherein for example NFC bio-implants which may read or record data may be utilised as identification tags for individuals.

Figure 8:
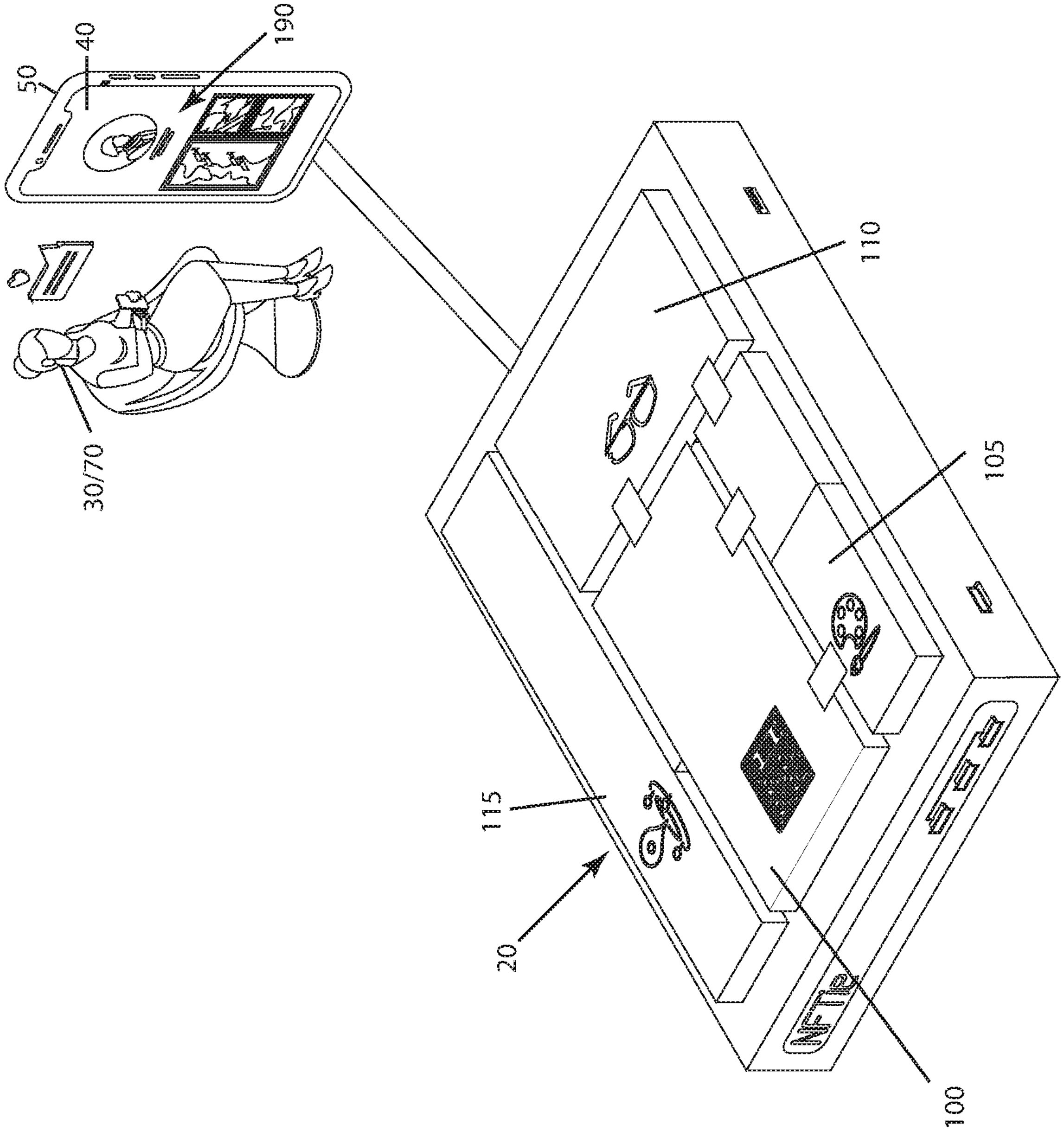
FIG. 8 illustrates a diagram associated with an example interface of the software application including a chat/alerts/notifications interface.

FIG. 8 shows in greater detail Segment 800 of FIG. 1 and, in particular, an example interface (190) associated with software application (40) which may be accessed by both sets of users (30) and (70), enabling additional functionality such as a chat function which allows users to communicate with one another using text, emoji, gif functions, and to enable reaction functionality with customizable emojis. An example of a live chat function which may be useful occurs where users (30) and (70) are engaging in a negotiation regarding the sale/trade of a digital asset (85), or for enabling the users to exchange additional information which may not necessarily be published on each user profile. The interface (190) may also be utilised to provide alerts and/or notifications to users (30) and (70). For example, where a user (70) has a particular digital asset (85) selected as a preference, and where the platform detects that the particular digital asset (85) preferred by the user (70) has become available for purchase or trade, the user (70) may be alerted by one or more notifications using interface (190) or by any other means including push notification, email or text message.

As used herein, the term "server", "system", "computer", "computing system" or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The one or more processors as described herein are configured to execute a set of instructions that are stored in one or more data storage units or elements (such as one or more memories), in order to process data. For example, the one or more processors may include or be coupled to one or more memories. The data storage units may also store data or other information as desired or needed. The data storage units may be in the form of an information source or a physical memory element within a processing machine.

The set of instructions may include various commands that instruct the one or more processors to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units. It is to be understood that the processing or control units may represent circuits, circuitry, or portions thereof that may be implemented as hardware with associated instructions (eg. software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like.

Optionally, the one or more processors may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in the figures or a described method.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word “comprise”, and variations such as “comprises” and “comprising”, will be understood to imply the inclusion of a stated feature or step, or group of features or steps, but not the exclusion of any other feature or step or group of features or steps.

The claims defining the invention are as follows:

1. A computer-implemented method of providing a digital asset marketplace, the method comprising:

providing, by one or more processors, one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of:

a real-world object, and a body or body part associated with the one or more first users, comprising persons or animals associated with the one or more first users, wherein each selectable location or space has a geo-location associated therewith;

receiving, by one or more processors, a selection from the one or more first users regarding particular location(s) or space(s) upon which the one or more first users prefer to virtually display their digital asset(s), and details regarding their digital asset(s);

uploading, by one or more processors, the digital asset(s) to the particular location(s) or space(s) selected by the one or more first users;

receiving, by one or more processors, from a data communications device associated with a second user, a request to locate digital assets available for purchasing and/or trading within a particular geographical area;

causing, by one or more processors, the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device such that when the AR device of the second user arrives at the geo-location associated with the location or space and a camera device associated with the AR device is used to view same, an augmented experience is activated for the second user with the ability to view available digital assets associated with the geo-location;

prompting, by one or more processors, the second user to purchase or trade a digital asset selected from the available digital assets using another digital asset owned by the second user; and based on the second user selecting an available digital asset for purchase or trade and compensating the first user according to agreed purchase or trade terms, updating, by one or more processors, the ownership of the digital asset including comprising updating a blockchain with which the digital asset is associated and a destination blockchain to which the digital asset is to transfer in accordance with the purchase or trade terms, by:

deploying a first smart contract to the blockchain with which the digital asset is associated in a locked state, and deploying a second smart contract to the destination blockchain for the purpose of unlocking the digital asset of the destination blockchain.

2. The method of claim 1, wherein the available digital assets are owned or managed by the one or more first users via Non-Fungible Tokens (NFTs).

3. The method of claim 2, wherein the NFTs comprise sound, video(s) and/or image(s).

4. The method of claim 1, wherein each location or space is layered with a plurality of different digital assets.

5. The method of claim 4, further comprising:

prompting, by one or more processors, the second user to view each available digital asset of the plurality of different digital assets associated with the location or space by swiping through graphical representations of the digital assets using the AR device of the second user.

6. The method of claim 5, wherein the second user is prompted to utilise a left and right swipe function to view the different digital assets.

7. The method of claim 1, wherein the other digital asset owned by the second user that is used to purchase or trade the available digital asset comprising one or more of:

cryptocurrency, and tokenized assets.

8. The method of claim 1, wherein the real-world object, or body or body part associated with the first user or person or animal associated therewith, comprises a digital marker that, when scanned using a camera device associated with the AR device of the second user, activates an augmented experience for the second user comprising providing the second user with the ability to view digital assets associated with the marker.

9. The method of claim 8, wherein the digital marker comprises a Quick Response (QR) code.

10. The method of claim 8, wherein the real-world object with which the digital marker is associated is a structural component of a building or streetscape, comprising one or more of:

a wall, a roof, a window, and a door.

11. The method of claim 1, wherein the real-world object selected by the first user comprises the geo-location such that when the AR device of the second user arrives at the geo-location and a camera device associated with the AR device is used to view the real-world object, the augmented experience is activated for the second user which provides the second user with the ability to view digital assets associated with the geo-location.

12. The method of claim 1, wherein the body or body part associated with the first user or person or animal associated therewith, comprises wearable technology that, when scanned using a camera device associated with the AR device of the second user, activates the augmented experience for the second user comprising providing the second user with the ability to view digital assets associated with the wearable technology.

13. The method of claim 12, wherein the wearable technology comprises one or more of:

clothing embedded with a digital asset, a near field communications (NFC) dongle, a bio-implant NFC chip, and an externally bonded NFC chip.

14. The method of claim 1, further comprising:

providing, by one or more processors, a facility to the second user to record details with respect to their preferences comprising favourite artist(s) and genre(s), and providing, by one or more processors, one or more recommendations to the second user regarding available digital assets based upon the recorded details of the second user.

15. The method of claim 14, further comprising receiving location data relating to movement of the second user and updating the recorded details of the second user accordingly such that the one or more recommendations to the second user regarding available digital assets are further based on the location data.

16. The method of claim 1, further comprising:

providing, by one or more processors, a live chat function that enables the first and second users to communicate via their respective devices including to negotiate purchase and/or trading terms with respect to available digital assets owned by the first users.

17. The method of claim 1, further comprising:

prompting, by one or more processors, the first user to block out or distort an image of one or more features associated with the particular location(s) or space(s) upon which the first user prefers to virtually display their digital asset(s), such that the selected feature(s), when viewed by a second user by means of the AR device, are blocked out or distorted to an extent that prevents the second user from viewing and/or identifying the selected feature(s).

18. A system for providing a digital asset marketplace, the system comprising one or more processors that:

provide one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of:

a real-world object, and a body or body part associated with the one or more first users, comprising persons or animals associated with the one or more first users, wherein each selectable location or space has a geo-location associated therewith;

receive a selection from the one or more first users regarding particular location(s) or space(s) upon which the one or more first users prefer to virtually display their digital asset(s), and details regarding their digital asset(s);

upload the digital asset(s) to the particular location(s) or space(s) selected by the one or more first users;

receive, from a data communications device associated with a second user, a request to locate digital assets available for purchasing and/or trading within a particular geographical area; and cause the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device such that when the AR device of the second user arrives at the geo-location associated with the location or space and a camera device associated with the AR device is used to view same, an augmented experience is activated for the second user with the ability to view available digital assets associated with the geo-location;

prompt the second user to purchase or trade a digital asset selected from the available digital assets using another digital asset owned by the second user; and based on the second user selecting an available digital asset for purchase or trade and compensating the first user according to agreed purchase or trade terms, update the ownership of the digital asset comprising updating a blockchain with which the digital asset is associated and a destination blockchain to which the digital asset is to transfer in accordance with the purchase or trade terms, by:

deploying a first smart contract to the blockchain with which the digital asset is associated in a locked state, and deploying a second smart contract to the destination blockchain for the purpose of unlocking the digital asset of the destination blockchain.

19. A non-transitory computer-readable medium, comprising instructions that when executed on a computer, causes one or more processors of the computer to perform steps to provide a digital asset marketplace, comprising:

providing one or more first users with selectable locations or spaces available for displaying digital assets, wherein the selectable locations or spaces are suitable for displaying digital assets that are available for purchase or trade and that are viewable by means of Augmented Reality (AR) devices, the selectable locations or spaces associated with one or more of:

a real-world object, and a body or body part associated with the one or more first users, comprising persons or animals associated with the one or more first users, wherein each selectable location or space has a geo-location associated therewith;

receiving a selection from the one or more first users regarding particular location(s) or space(s) upon which the one or more first users prefer to virtually display their digital asset(s), and details regarding their digital asset(s);

uploading the digital asset(s) to the particular location(s) or space(s) selected by the one or more first users;

receiving, from a data communications device associated with a second user, a request to locate digital assets available for purchasing and/or trading within a particular geographical area; and causing the data communications device associated with the second user to display a map of the particular geographical area, the map displaying any locations or spaces in which digital assets of the one or more first users are viewable by the second user, by means of an AR device, wherein the second user is required to be physically present at the location or space to view the digital asset(s) by means of the AR device such that when the AR device of the second user arrives at the geo-location associated with the location or space and a camera device associated with the AR device is used to view same, an augmented experience is activated for the second user with the ability to view available digital assets associated with the geo-location;

prompt the second user to purchase or trade a digital asset selected from the available digital assets using another digital asset owned by the second user; and based on the second user selecting an available digital asset for purchase or trade and compensating the first user according to agreed purchase or trade terms, update the ownership of the digital asset comprising updating a blockchain with which the digital asset is associated and a destination blockchain to which the digital asset is to transfer in accordance with the purchase or trade terms, by:

deploying a first smart contract to the blockchain with which the digital asset is associated in a locked state, and deploying a second smart contract to the destination blockchain for the purpose of unlocking the digital asset of the destination blockchain.

* * * * *